Oct. 15, 1957 H. H. MUELLER 2,809,843

TURNTABLE MOUNTING FOR AUTOMATIC INTERLOCKING DUAL PHONOGRAPH RECORD PLAYER

Filed June 30, 1952

Herman H. Mueller
INVENTOR.

BY Clarence A. O'Brien
and Harvey B. Jacobson
Attorneys

United States Patent Office 2,809,843

Patented Oct. 15, 1957

2,809,843

TURNTABLE MOUNTING FOR AUTOMATIC INTERLOCKING DUAL PHONOGRAPH RECORD PLAYER

Herman H. Mueller, Ephrata, Pa.

Application June 30, 1952, Serial No. 296,382

10 Claims. (Cl. 274—39)

This invention comprises novel and useful improvements in a turntable and drive for automatic interlocking dual phonograph record players and comprises an improvement upon my prior Patent No. 2,729,455 of January 3, 1956, for Automatic Interlocking Dual Phonograph Record Player.

An important object of the invention is to provide improved mounting means for supporting and rotatably journalling a turntable, and especially a turntable of the interlocking type which is provided with a drive clutch surface mating with a corresponding surface upon the phonograph record disk.

A still further important object of the invention is to provide a novel turntable construction of much smaller diameter than the conventional turntable and which may be substantially disposed within that portion of the record disk which lies within the sound track; and which shall have an engagement of a frictionless non-slipping interlocking type with the record disc, which engagement shall lie entirely within and centrally of the sound track of the record.

Another very important object of this invention is to provide a novel and improved turntable construction and driving means whereby the turntable shall be driven from the source of power with a positive, non-slipping driving connection for insuring fidelity of pitch for perfect sound reproduction or transcription of the record disk in home or studio.

A further very important specific object is to provide a turntable and drive construction which will completely obviate any slippage and all frictional contacts of the records with the turntable and the latter with its source of power.

Yet another object of this invention is to reduce and substantially eliminate the noise resulting from the frictional engagement and the high speed rotation of large diameter turntables and frictional driving rollers.

A still further ancillary object of the invention is to provide an anti-friction ball bearing assembly for journalling the turntable.

These, together with various ancillary features and objects of the invention, which will later become apparent as the following description proceeds, are attained by the present invention, preferred embodiments of which have been illustrated, by way of example only, in the accompanying drawings, wherein.

Referring now more particularly to the accompanying drawings wherein similar numerals designate like parts throughout the various views, it will be noted that in general the same numerals are employed herein as are used for designating the corresponding parts in my above identified prior patent.

Figure 1:
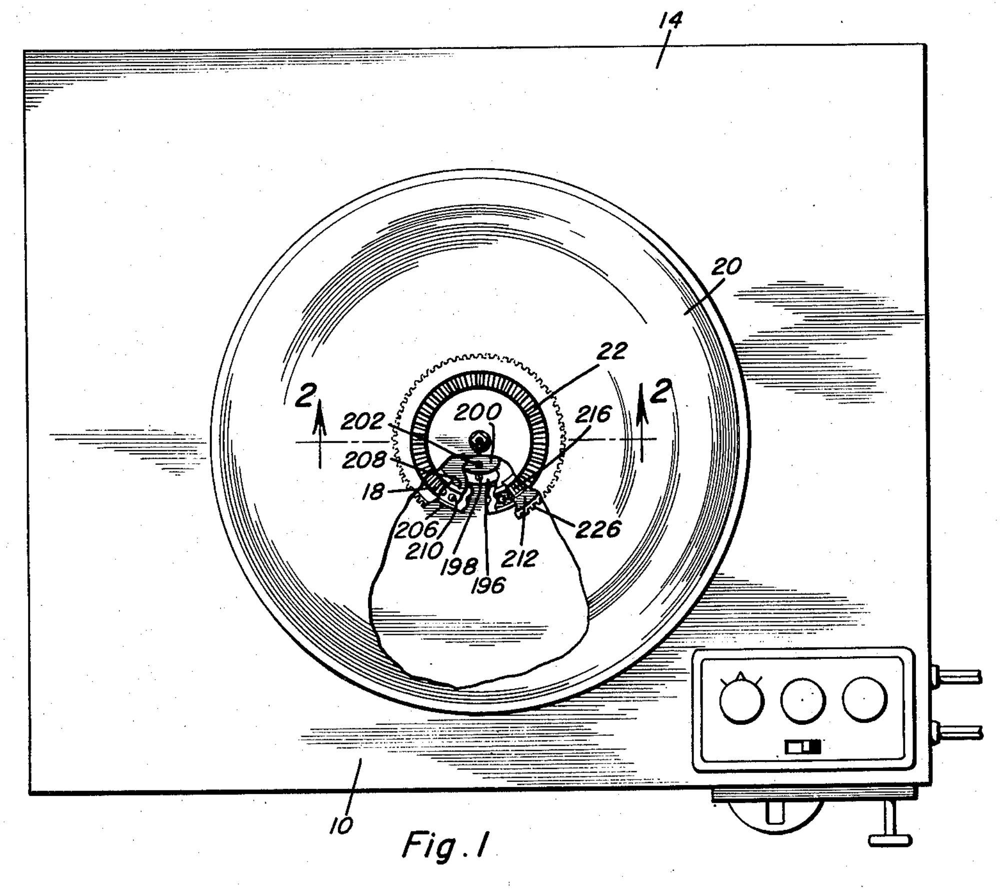
Figure 1 is a top plan view of a phonograph record player incorporating therein the principles of this invention, certain concealed parts being shown in dotted lines and parts being broken away.

In this embodiment of the invention, as shown in Figure 1, a casing or cabinet 10 is illustrated upon which a turntable 212 is mounted rotatably on the top 14 of the casing. The records, of otherwise conventional construction, generally indicated by the reference numeral 20 are provided with integrally formed or detachable annular raised surfaces 22. The surfaces 22 are positioned upon the top side and underside of the records in concentric relation to the center opening and are serrated or otherwise treated to provide an interlocking or clutch surface complementary to, and interlockingly engageable with the clutch surface 18 on the turntable, and with the corresponding surfaces of adjacent records.

It should be here noted that the interlocking clutch or driving ring 18 of the turntable may be either integrally formed upon the turntable, or may be formed upon a flexible removable covering engageable upon the turntable as set forth in my prior Patent No. 2,559,786, issued July 10, 1951, for Interlocking Phonograph Turntable Cover.

An important feature of this invention is the provision of means whereby turntables may be journalled and supported for rotation adjacent their peripheries, whereby the rotating mass may be made lighter in weight and the turntable may be more rigidly supported against displacement from the true horizontal plane of rotation. For this purpose, the lower end of the record spindle 194 is provided with a mounting flange 196 secured to the top of the casing 14 as by fastening bolts 198. Vertically spaced from the flange 196, the spindle is provided with a second horizontally extending flange 200 of any desired manner, the supporting plate 204 being mounted upon the flange 200 as by bolts 202. Alternatively, the plate 204 could be integral with the flange.

Adjacent its periphery, the top surface of the plate 204 is provided with annular concentric upstanding ribs, the outermost being designated 206 while the inner ring or inner rib is indicated at 208. An anti-friction bearing assembly of any desired type indicated at 210 is disposed between these ribs, and rotatably supports upon the plate 204 a turntable 212 which consists of an annulus.

The bottom surface of the annulus constituting the turntable 212 is provided with a depending ring or rib 214 lying between the annular ribs 206, 208 and which rests upon the anti-friction bearing assembly 210, while the top side of the turntable is provided with an upraised annular clutch or interlocking drive surface 216 which is similar to the previously mentioned surfaces 18.

Figure 2:
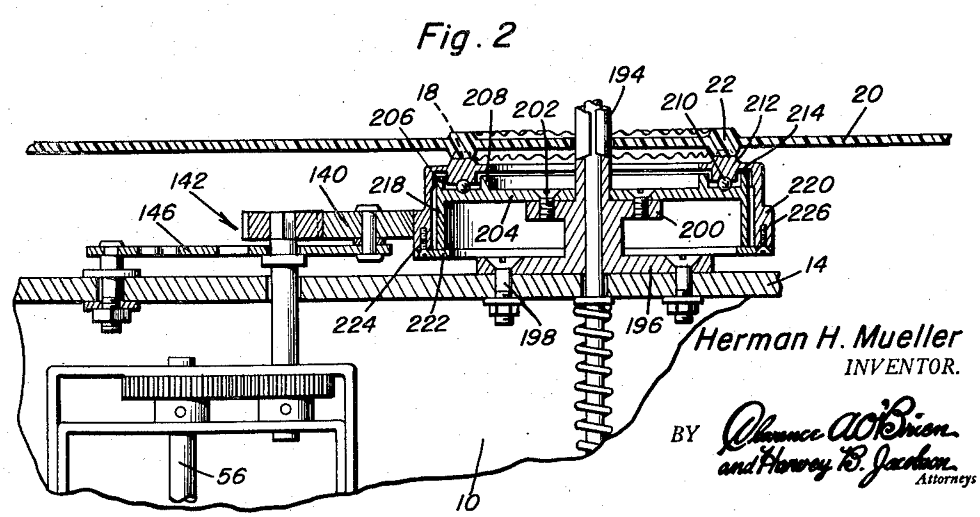
Figure 2 is a view of the turntable mounting arrangement of this invention and is taken substantially upon the plane of the section line 2—2 of Figure 1.

The plate 204 is provided with a depending circumferential skirt or sleeve 218 which is surrounded by a corresponding circumferential rim or sleeve 220 depending from the turntable 212. A ring 222 is detachably secured as by fastening bolts 224 to the bottom surface of the rim 220 of the turntable, this ring underlying the bottom edge of the sleeve 218. If desired a slight clearance could be provided at this location, or a sliding contact could be utilized. In any event, the ring 222 provides a means for detachably securing the turntable upon its mounting means. As shown more clearly in Figure 2, the turntable is of course provided with an external ring gear 226 and is engaged by an idler gear 140 mounted upon a supporting frame 146, whereby a non-slipping positive gear drive of the turntable is obtained.

The idler gear 140 forms part of a variable speed drive mechanism indicated generally by the numeral 142 and which is driven by an electric motor, not shown, through a shaft 56. Since the details of the gearing assembly form no part of the invention claimed herein, further reference thereto is deemed to be unnecessary.

In place of the external ring gear 226, the embodiment illustrated could be provided with an internal ring gear.

It will be understood that the above described constructions possess the advantages of a much stronger and more efficient support and anti-friction bearing for mounting the turntable; permits the latter to be of much lighter construction; provides an easy means for assembling or removing a turntable; and enables, if desired, different sizes of turntables to be engageably mounted upon the same supporting structure.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A turntable construction for record players comprising a stationary spindle, a turntable, means supporting and journaling said turntable for rotation about said spindle, means for rotating said turntable, said turntable comprising an annular ring having its lower surface engaging said journaling means and having on its upper surface an annular ring of upstanding teeth adapted for interlocking engagement with a ring of complementary teeth on a record disk for establishing a positive, non-slipping and interlocking drive therewith.

2. The combination of claim 1 wherein said supporting and journaling means includes a horizontal plate carried by said spindle, a pair of annular ribs on said plate, a bearing assembly disposed between said ribs, said turntable having an annular depending portion lying between said ribs and mounted upon said bearing assembly.

3. A turntable construction for record players comprising a stationary spindle, a turntable, means supporting and journaling said turntable for rotation about said spindle, means for rotating said turntable, said turntable having an annular ring of upstanding teeth adapted for interlocking engagement with a ring of complementary teeth on a record disk for establishing a positive non-slipping and interlocking drive therewith, said turntable having a depending cylindrical rim surrounding said supporting and journaling means, a flange secured to said rim and underlying said supporting and journaling means whereby to retain said turntable upon the latter.

4. A turntable construction for record players comprising a stationary spindle, a turntable, means supporting and journaling said turntable for rotation about said spindle, means for rotating said turntable, said turntable comprising an annular ring having its lower surface engaging said journaling means and having on its upper surface an annular ring of upstanding teeth adapted for interlocking engagement with a ring of complementary teeth on a record disk for establishing a positive, non-slipping and interlocking drive therewith, said turntable having a depending cylindrical rim surrounding said supporting and journaling means, a flange secured to said rim and underlying said supporting and journaling means whereby to retain said turntable upon the latter.

5. A turntable construction for record players comprising a stationary spindle, a turntable, means supporting and journaling said turntable for rotation about said spindle, means for rotating said turntable, said turntable comprising an annular ring having on its upper surface an annular ring of upstanding teeth adapted for interlocking engagement with a ring of complementary teeth on a record disk for establishing a positive, non-slipping and interlocking drive therewith, said supporting and journaling means comprising a stationary horizontal plate having a pair of upstanding annular ribs, said annular ring having a depending rib guidingly received between said pair of annular ribs.

6. The combination of claim 5 including an anti-friction bearing assembly disposed between the upstanding ribs and supporting said depending rib.

7. The combination of claim 5 wherein said horizontal plate and said annular ring have concentric depending cylindrical sleeves.

8. The combination of claim 5 wherein said horizontal plate and said annular ring have concentric depending cylindrical sleeves, retaining means on one of said sleeves and cooperating with the other sleeve for retaining said turntable upon said supporting and journaling means.

9. The combination of claim 1 wherein said turntable has a depending annular flange and said means for rotating said turntable has a positive and non-slipping operative driving connection with said depending flange.

10. The combination of claim 1 wherein said turntable has a depending annular flange and said means for rotating said turntable has a positive and non-slipping operative driving connection with said depending flange, said depending flange having an external ring gear upon its outer surface, said means for rotating said turntable including a driving gear disposed outside of said depending flange and engaging said external ring gear.

References Cited in the file of this patent

UNITED STATES PATENTS

| | | |
|---|---|---|
| 741,247 | Johnson | Oct. 13, 1903 |
| 1,480,628 | Nolen | Jan. 15, 1924 |
| 1,790,687 | Watkins | Feb. 3, 1931 |
| 2,106,778 | Volk | Feb. 1, 1938 |
| 2,119,218 | Rodger | May 31, 1938 |
| 2,241,013 | Gay | May 6, 1941 |
| 2,247,658 | Guedon | July 1, 1941 |
| 2,260,319 | Hoehn | Oct. 28, 1941 |
| 2,262,731 | Gruber | Nov. 11, 1941 |
| 2,486,898 | Wennerbo | Nov. 1, 1949 |
| 2,542,759 | Exley | Feb. 20, 1951 |
| 2,559,786 | Mueller | July 10, 1951 |